Figure 1:
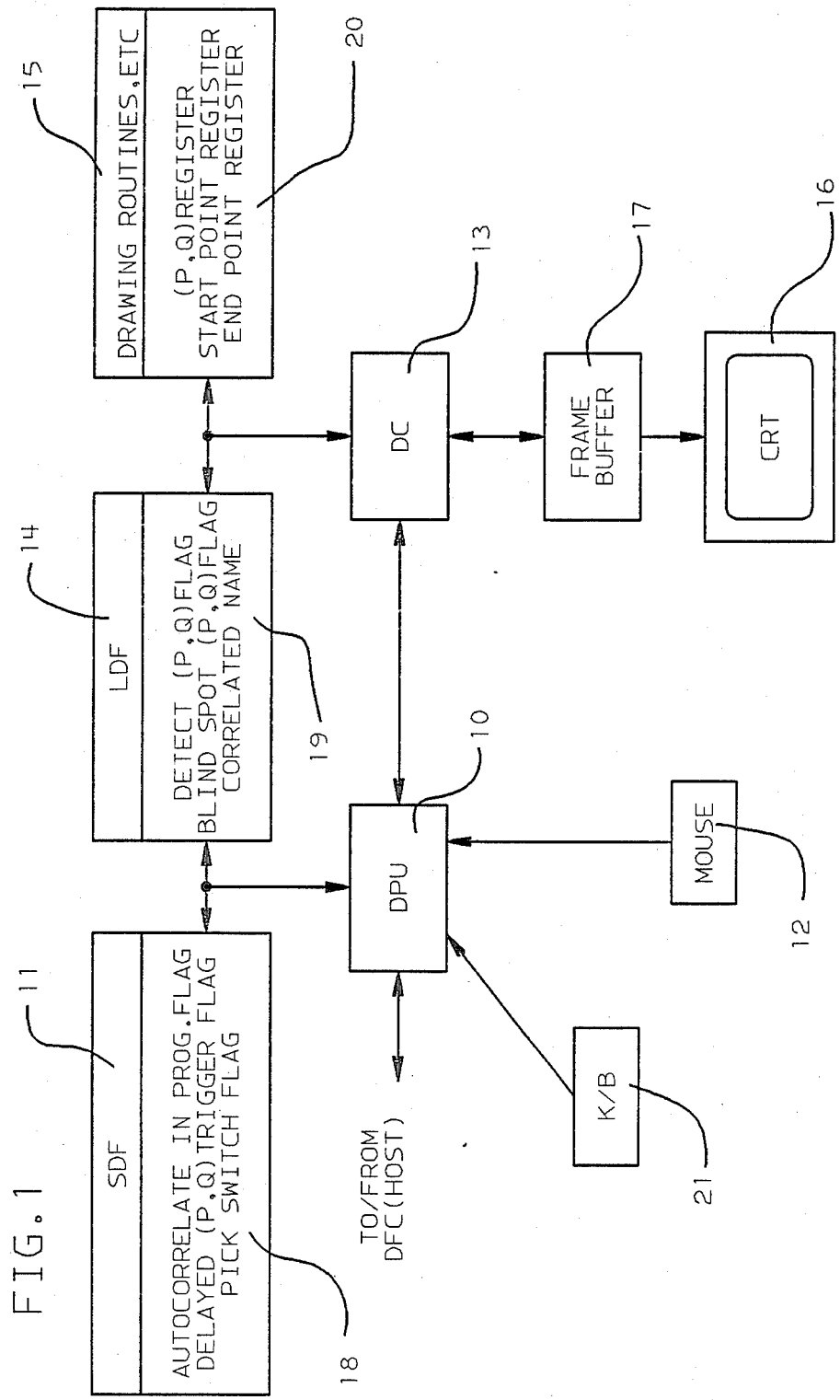

United States Patent [19]

Murphy

[11] Patent Number: 4,725,829
[45] Date of Patent: Feb. 16, 1988

[54] AUTOMATIC HIGHLIGHTING IN A RASTER GRAPHICS DISPLAY SYSTEM

[75] Inventor: Alan S. Murphy, Eastleigh, United Kingdom

[73] Assignee: International Business Machines Corporation, Armonk, N.Y.

[21] Appl. No.: 773,385

[22] Filed: Sep. 6, 1985

[30] Foreign Application Priority Data

Sep. 12, 1984 [EP] European Pat. Off. ....... 084306223.3

[51] Int. Cl.[4] ............................................. G09G 1/16
[52] U.S. Cl. .................................... 340/709; 340/723; 340/747
[58] Field of Search ............... 340/709, 710, 707, 712, 340/706, 791, 747, 723, 724

[56] References Cited

U.S. PATENT DOCUMENTS

| | | | |
|---|---|---|---|
| 4,464,652 | 8/1984 | Lapson et al. | 340/709 |
| 4,586,035 | 4/1986 | Baker et al. | 340/723 |
| 4,587,520 | 5/1986 | Astle | 340/709 |
| 4,683,468 | 7/1987 | Himelstein et al. | 340/709 |
| 4,686,522 | 8/1987 | Hernandez et al. | 340/709 |

FOREIGN PATENT DOCUMENTS 0112414 12/1982 European Pat. Off. .

OTHER PUBLICATIONS

Williams, Gregg; "The Lisa Computer System", *Byte*, Feb. 1983, pp. 33–50.
Patents Abstracts of Japan, vol. 7, No. 70 (P-185)[1215], Mar. 23, 1983; & JP-A-58 1232 (Hitachi Seisakusho KK.) 06-01-1983.

*Primary Examiner*—Gerald L. Brigance
*Attorney, Agent, or Firm*—George E. Clark; Joseph J. Connerton; Frederick D. Poag

[57] ABSTRACT

In an interactive graphics display system in which pels in a frame buffer are mapped to the display screen of a raster display device, a method of automatically highlighting and de-highlighting graphic segments as a cursor is moved across the display screen comprises sampling a locator device at successive points in time to generate a screen cursor at corresponding positions on the screen, examining pels in the frame buffer along a line which extends from the pel corresponding to the previous cursor position to the pel corresponding to the current cursor position to determine whether a pel is "on" along the line, automatically performing a correlate operation in respect of the "on" pel (if any) to identify the graphic segment associated with that pel, and highlighting the segment so identified, any highlighted segment being de-highlighted prior to highlighting a different segment.

8 Claims, 7 Drawing Figures

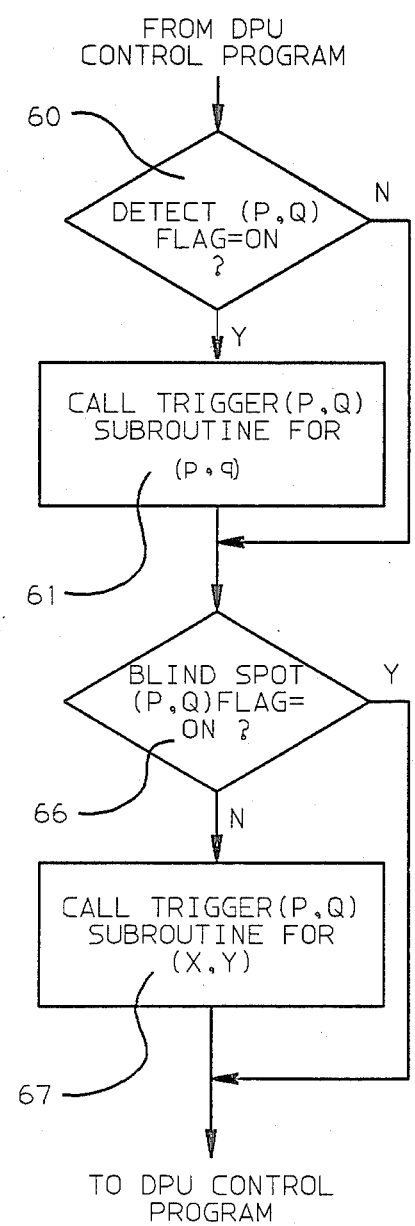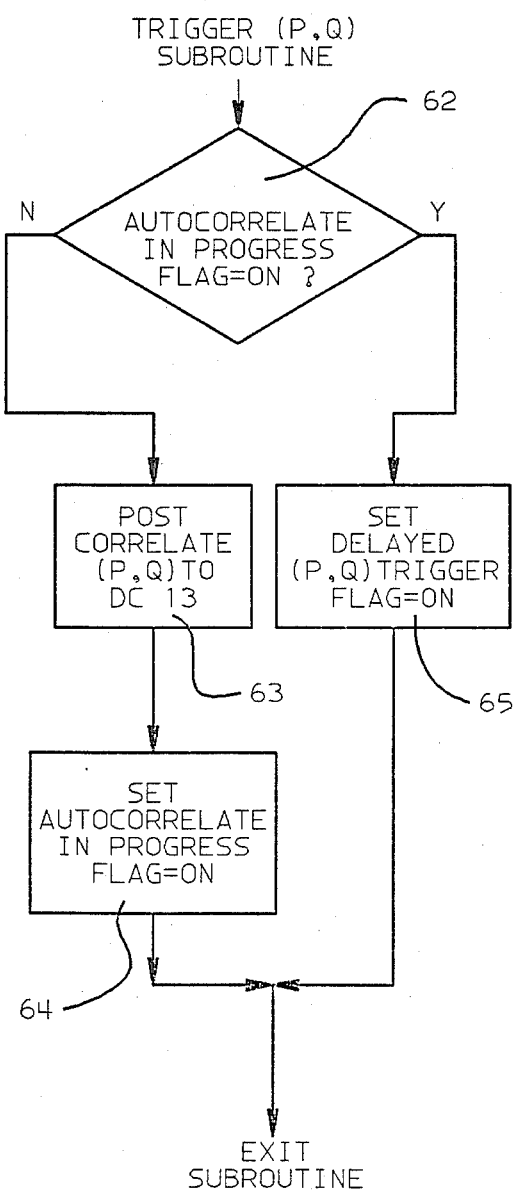

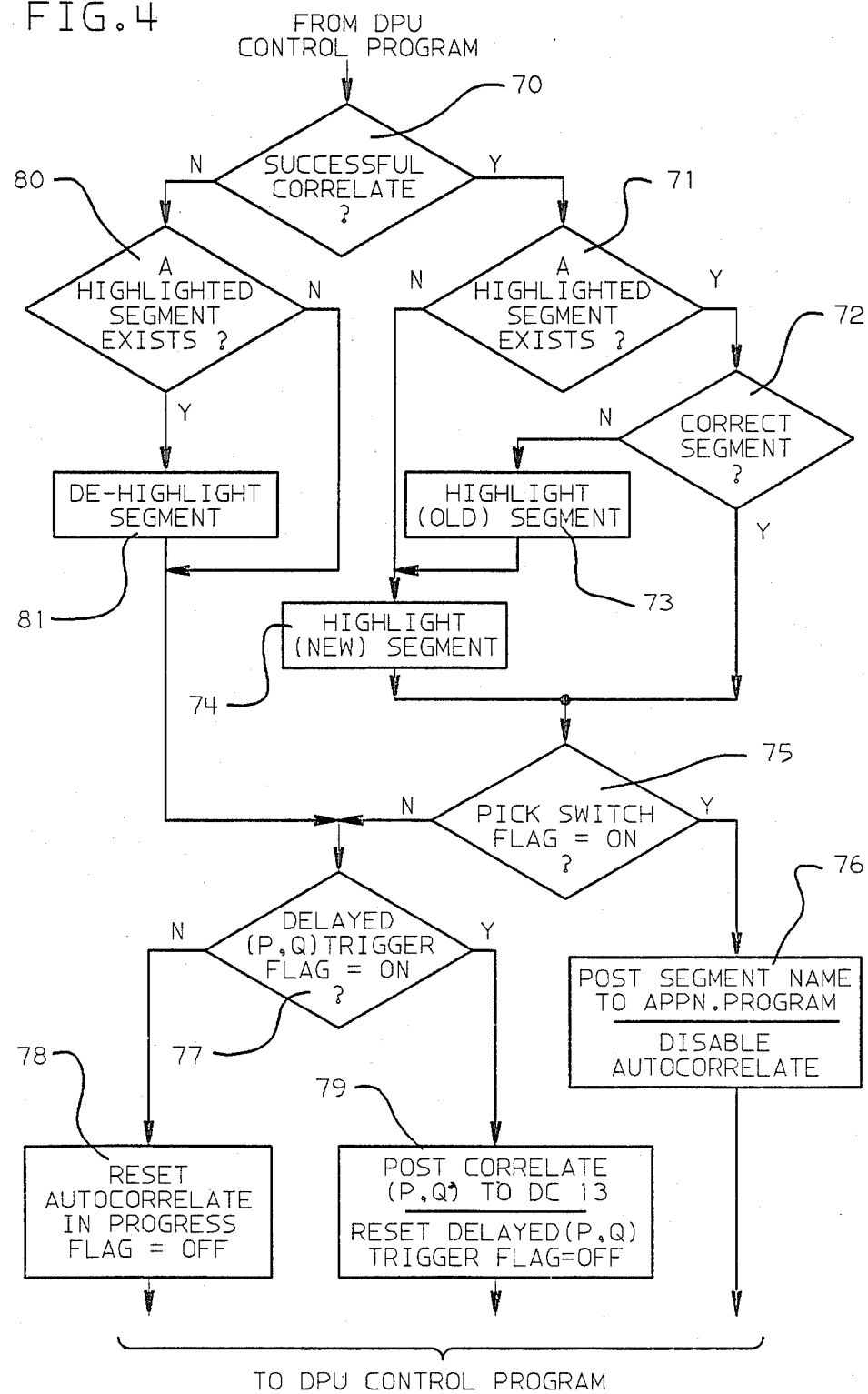

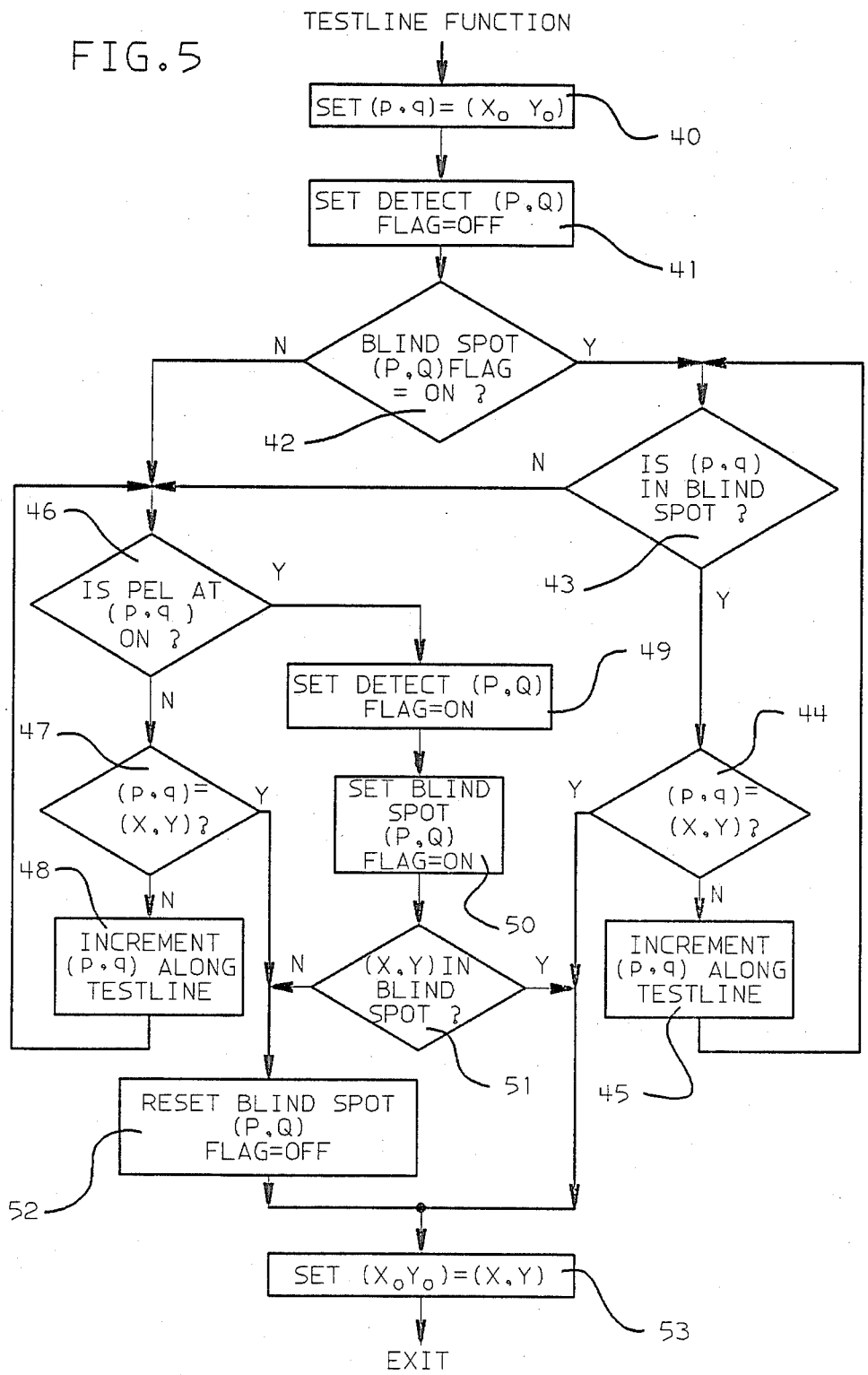

AUTOMATIC HIGHLIGHTING IN A RASTER GRAPHICS DISPLAY SYSTEM

This invention relates to a method of automatically highlighting and de-highlighting graphic segments as a cursor is moved across the display screen of an interactive raster graphics display system such as one using a CRT or gas panel; in particular for emulating one mode of operation of the IBM 3250 directed beam (calligraphic) graphics terminal.

In the mode of operation referred to, the IBM 3250 performs automatic segment correlation and highlighting whenever a light pen detects light from the screen. Since the IBM 3250 processes the display list for each CRT screen refresh cycle, both correlation and highlighting can occur within the refresh cycle and can be independent of the state of the tip-switch of the light pen. This is because each graphic segment is drawn directly from the display list on each refresh cycle and therefore the screen position of the detected light gives an immediate indication of the current entity. Thus, with suitable programming of the display list buffer, if the light pen is moved across the screen the user will perceive automatic highlighting and de-highlighting of graphic segments. Then, when a desired segment has been found and highlighted, the segment name can be posted to the host computer by depression of the tip-switch.

With the increasing use of raster techniques in graphics systems, it is desirable to be able to provide a similar function on a raster system using a table, mouse, trackball or other locator device. As in well known, such devices are sampled at successive points in time (usually at the frame rate in the case of CRT) to provide a succession of X, Y screen coordinates which are tracked or echoed on the screen by the position of a screen cursor to provide visual feedback to the user—see Section 5.2.1 on page 184 of the textbook "Fundamentals of Interactive Computer Graphics" by Foley and Van Dam, published 1982 by Addison-Wesley Publishing Company, Inc.

There are, however, substantial problems associated with the use of locator devices for this purpose. First, since the device does not respond to light from the screen, it is not possible for the system to determine directly when the screen cursor is at or near a light-emitting picture element (pel). Furthermore, in raster graphics, processing of the display list generally only occurs once for any given image and causes "on" pels, i.e. pels which differ in color and/or intensity from their background, to be set into a frame buffer whose contents are mapped to the display screen. In the case of a raster scan CRT the display is refreshed from the frame buffer by a refresh controller which cycles through the contents of the buffer at frame rate and maps the pels to the display screen. In the case of a gas panel, however, the panel has inherent storage which means that the frame buffer is an integral part of the display device. In this case mapping to the screen is direct and no refresh is required. In neither case is it is possible to directly associate a given "on" pel with the segment which set that pel simply by detection of the "on" pel on the screen or in the frame buffer—a separate correlate operation must be performed.

However, in raster graphics the correlate operation is relatively slow and unless substantial computing power is available it is not practical to correlate on every pel in the cursor path as the latter is moved across the screen. The present invention is therefore directed to providing automatic correlation and highlighting/de-highlighting in a raster display by a technique which generally only triggers the correlate function when the locator cursor is at or near an "on" pel.

Accordingly, in an interactive graphics display system in which pels in a frame buffer are mapped to the display screen of a raster display device, the invention provides a method of automatically highlighting and de-highlighting graphic segments as a cursor is moved across the display screen, the method including sampling a locator device at successive points in time to generate a screen cursor at corresponding positions on the screen, examining pels in the frame buffer along a line which extends from the pel corresponding to the previous cursor position to the pel corresponding to the current cursor position to determine whether a pel is "on" along the line, such pel examination occurring at least when the current cursor position is greater than a certain distance from a previously detected "on" pel, automatically performing a correlate operation in respect of the "on" pel (if any) to identify the graphic segment associated with that pel, the correlate operation being performed at least when a prior correlate operation is not already in progress, and highlighting the said segment, any highlighted segment being de-highlighted prior to highlighting a different segment.

Preferably, when one or more "on" pels are detected while a prior correlate operation is in progress, the coordinates of the "on" pel detected most recently before the completion of the prior correlate operation are stored and a further correlate operation is automatically performed in respect of the pel identified by the stored coordinates immediately upon completion of the prior correlate operation. Also, when an "on" pel is detected, a blind spot is preferably set centered on the detected pel (correlate trigger point) which inhibits further pel examination until the cursor position moves out of the blind spot, i.e. a certain distance from the detected pel. The blind spot is conveniently the same size as the correlate trap aperture or pick window—see page 362 of the abovementioned textbook. In this case short movements of the cursor position around a detected "on" pel will not trigger further correlate operations permitting the graphic segment associated with that pel to remain highlighted.

In the embodiment of the invention to be described, pel examination along the said line occurs in the direction from the previous to the current cursor position, starting either at the previous cursor position or at the first pel outside a blind spot if one is set, and halts when the first "on" pel (if and) is encountered. In this case it is also desirable to perform a further automatic correlate operation at the current cursor position, unless that position lies within a blind spot, and to de-highlight any highlighted segment in the event that the correlate operation does not identify a graphic segment. This will ensure that a segment does not stay highlighted if the cursor moves significantly beyond the trigger point which caused such highlighting, and will also check for segments at or near the current cursor position.

It is to be understood that the invention is applicable not only to raster display devices such as CRTs which require periodic refresh from a separate frame buffer, but also to inherent storage devices such as gas panels which effectively incorporate the frame buffer within the device itself. In raster graphics systems using a CRT and separate frame buffer, each pel in the frame buffer normally consists of a plurality of bits so that a number of grey shades or colors may be defined. In this case the frame buffer is notionally regarded as comprising multiple parallel bit planes equal in number to the number of bits in a pel, each pel being defined by a combination of bits taken perpendicularly through the planes. In such a case an "on" pel is to be regarded as any predetermined bit or combination of bits taken from one, some or all of the bit planes. This gives the possibility of correlating on only certain shades of grey or certain colors. For example, if the frame buffer consisted of three bit planes for red, green and blue respectively, it would be possible to correlate only on yellow segments by examining for the combination of bits "110" in the red, green and blue planes respectively.

The correlated segment may be highlighted in conventional fashion by brightening or blinking, or by displaying the entity in reverse video, but any other technique which provides a change in the visible characteristics of the entity may be used. In the extreme it is regarded that highlighting could be achieved by replacing the graphic segment by an alphanumeric description thereof. The term "highlighting" is to be interpreted accordingly.

The line along which pels are to be examined (herein referred to as a testline) may be generated by any incremental line drawing mechanism which, given the endpoints of a line (in this case the previous and current cursor positions), steps incrementally along the line generating a succession of X,Y coordinates. However, for the testline these coordinates simply denote the pels to be examined and no actual writing into the frame buffer occurs. As will be described, in the preferred embodiment the testline generation and pel examination is implemented by a new graphic order, referred to herein as a TESTLINE order, which executes a "pseudo-draw" from the previous cursor position to the current cursor position testing each intervening pel in the frame buffer for being "on".

The incremental line drawing mechanism which is used to generate the testline may be that based on Bresenham's algorithm or any other conventional algorithm. However, in order to guard against non-detection when a segment line is drawn in odd-parity buffer locations whereas the testline is drawn in even-parity locations, it will be desirable to use either a thick line mode for the testline or a square move only Bresenham algorithm for generating the testline which produces only fully square-connected lines. Furthermore, for the detection of structured (e.g. dashed or dotted) lines it may be desirable to use a number of testlines which are parallel to and straddle the cursor path.

Figure 6:
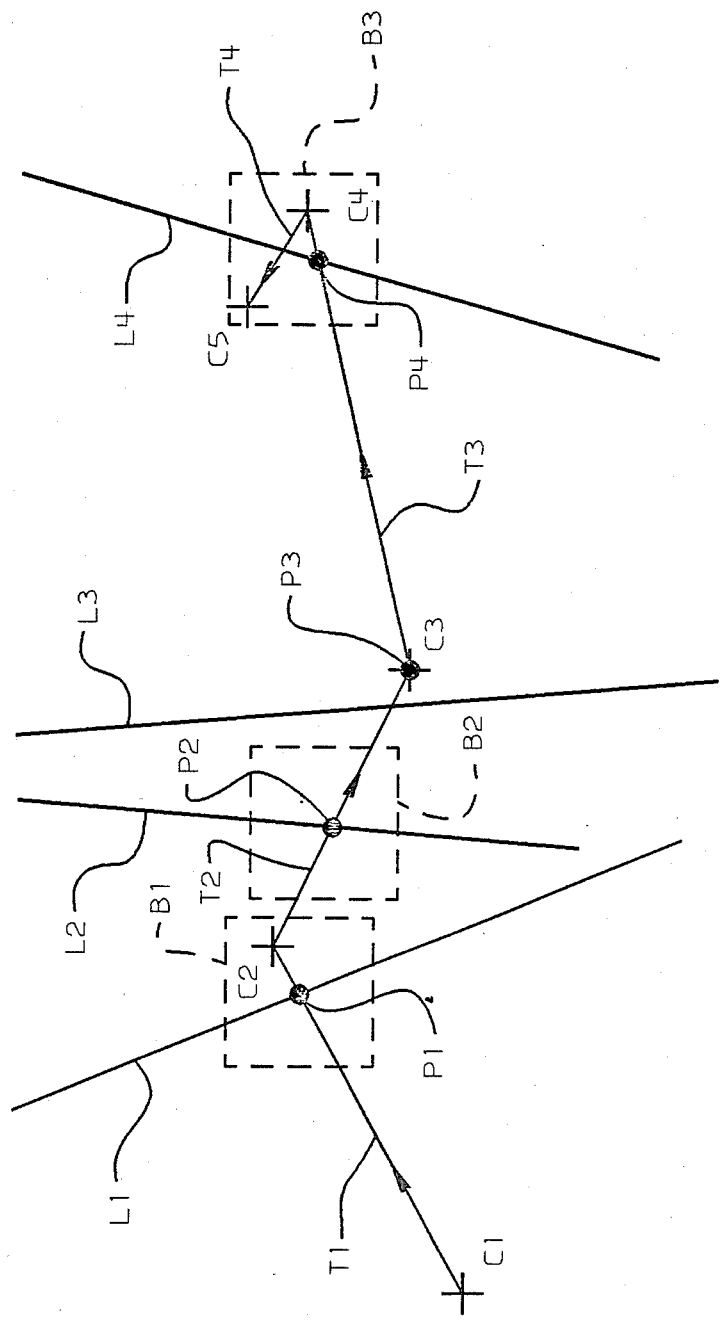

An embodiment of the invention will now be described, by way of example, with reference to the accompanying drawings, in which:

FIG. 1 is a block diagram of a raster graphics system in which the method of the present invention may be used, FIGS. 2 to 5 are flow diagrams illustrating one embodiment of the invention which may be implemented on the system of FIG. 1, and FIG. 6 is a schematic diagram illustrating the effect of the embodiment of FIGS. 2 to 5 as seen on the display screen.

The system shown in FIG. 1 is of a well-known kind and is based upon the systems shown in section 10.6 of the aforementioned textbook "Fundamentals of Interactive Computer Graphics". It is typical of the kind of system in which the present method may be used.

In FIG. 1 it is assumed that a display file compiler (DFC) generates a structured display file (SDF) which is shipped to a display processing unit (DPU) 10 for storage in the DPU's private random access memory (RAM) 11. The DFC may be a host processor as shown, or it may be the same processor as the DPU 10. The form of DFC is not relevant to the present invention. The DPU 10 performs the following functions:

(a) Maps the SDF to the linear display file (LDF).

(b) Samples a locator (cursor control) device, which in this case is assumed to be a mouse 12, and issues update orders (i.e. it maintains the cursor position in logical coordinate space).

(c) Issues highlighting and dehighlighting orders.

The LDF together with other orders are passed to a display controller (DC) 13 via a shared RAM 14. The DC 13 performs the following functions, using routines stored in its private RAM 15:

(d) Maps the LDF to the image on the display screen of a raster scan CRT 16.

(e) Converts from logical coordinates to pel coordinates in a frame buffer 17.

(f) Performs correlate operations.

(g) Performs the highlighting-dehighlighting function.

In this form of system configuration it is imperative to reduce the inter-processor communication to a minimum whilst still retaining the ability to respond rapidly to cursor movement.

Consider first the user's possible range of actions; he may:

(a) Move the mouse such that the cursor echoes the mouse position on the display screen.

(b) Depress the mouse pick switch.

(c) Move the mouse whilst the pick switch is depressed.

(d) Release the mouse pick switch.

The display terminal is continually updating the cursor position at frame refresh rate.

The terminal may be in one of several states:

(e) Disabled/Enabled for auto-correlate and highlighting.

(f) Pick switch depressed/released.

(g) Segment highlighted (Yes/No) on screen.

(h) Segment name signalled to host but not yet acknowledged.

This variety of states when coupled with the user's possible range of actions produces a fairly complex situation. The terminal must cater for all possibilities.

It is proposed that whenever the system is in the auto-correlate mode the following rules will be obeyed:

(1) If no highlighted segment exists and if the user moves the cursor across and "on" pel then an auto-correlate trigger point is created.

(2) That if an auto-correlation action has been triggered from a certain point then no further triggering can occur until the cursor is moved out of a "blind spot" surrounding this point. This effectively means that if an "on" pel has been detected within an area then the auto-correlate trigger mechanism is inhibited from any further detection within that area. In practice the size of the blind spot is made equal to the correlate trap aperture.

(3) Auto-correlate trigger points can be generated either in respect of an "on" pel detected outside a blind spot or when the cursor position moves from inside to outside a blind spot.

(4) That whilst an auto-correlate operation is in progress no further auto-correlation can be triggered. This restriction may cause the cursor not to detect "on" pels when it is moved rapidly over complex pictures. Without this restriction the correlate process could become overloaded. It is considered better to do correlation for the most recently generated trigger point rather than to queue them up and process them all.

(5) A successful correlate results in the identified segment being highlighted and in any other segment already highlighted being de-highlighted.

(6) An unsuccessful correlate results in any segment already highlighted being de-highlighted.

(7) If a highlighted segment exists and the user depresses the pick switch then that segment name is sent to the application program as a user-selected segment.

(8) If no highlighted segment exists and the user depresses the pick switch no further action occurs.

(9) If the pick switch is already depressed and a successful correlate occurs then the segment name is returned to the application program as a user-selected segment.

(10) The sending of a segment name to the host automatically disables the auto-correlate mechanism.

An implementation of this method for the system of FIG. 1 is shown in FIGS. 2 to 5. There are three phases to the operation:

| Phase | DPU 10 | DC 13 |
|---|---|---|
| 1 | Cursor Update Control. | Update Cursor Position. |
| 2 | Trigger Processing & Correlate Initiation. | Correlate Processing. |
| 3 | Correlate Post-processing Highlight/Dehighlight & Highlight/Dehighlight Initiation. | Processing. |

Each of these phases can be implemented either in one task or in separate tasks with inter-phase communication provided by means of state flags. In the present embodiment these phases are implemented as separately running tasks in the DPU 10. The cursor update processing task (FIG. 2) has highest priority and is executed at frame rate, typically 50 times/sec. The trigger processing and auto-correlate initiation task (FIG. 3) occurs whenever the DC 13 returns the result of a TESTLINE operation to the DPU 10. The correlate post-processing and highlighting task (FIG. 4) occurs whenever the DC 13 informs the DPU 10 about the result of a correlate operation.

The TESTLINE function (FIG. 5) is implemented in the DC 13. It is assumed that the correlate process being performed by the DC 13 uses standard techniques (see the aforementioned textbook) and therefore the flow diagram for this is not shown.

To assist in performing these tasks various parts 18, 19 and 20 of the memories 11, 14 and 15 respectively hold various pieces of information and flags needed during operation of the system in auto-correlate mode, as shown in FIG. 1. For completeness, FIG. 1 also shows a keyboard 21, which may be used to place the system in the auto-correlate mode.

Figure 2:
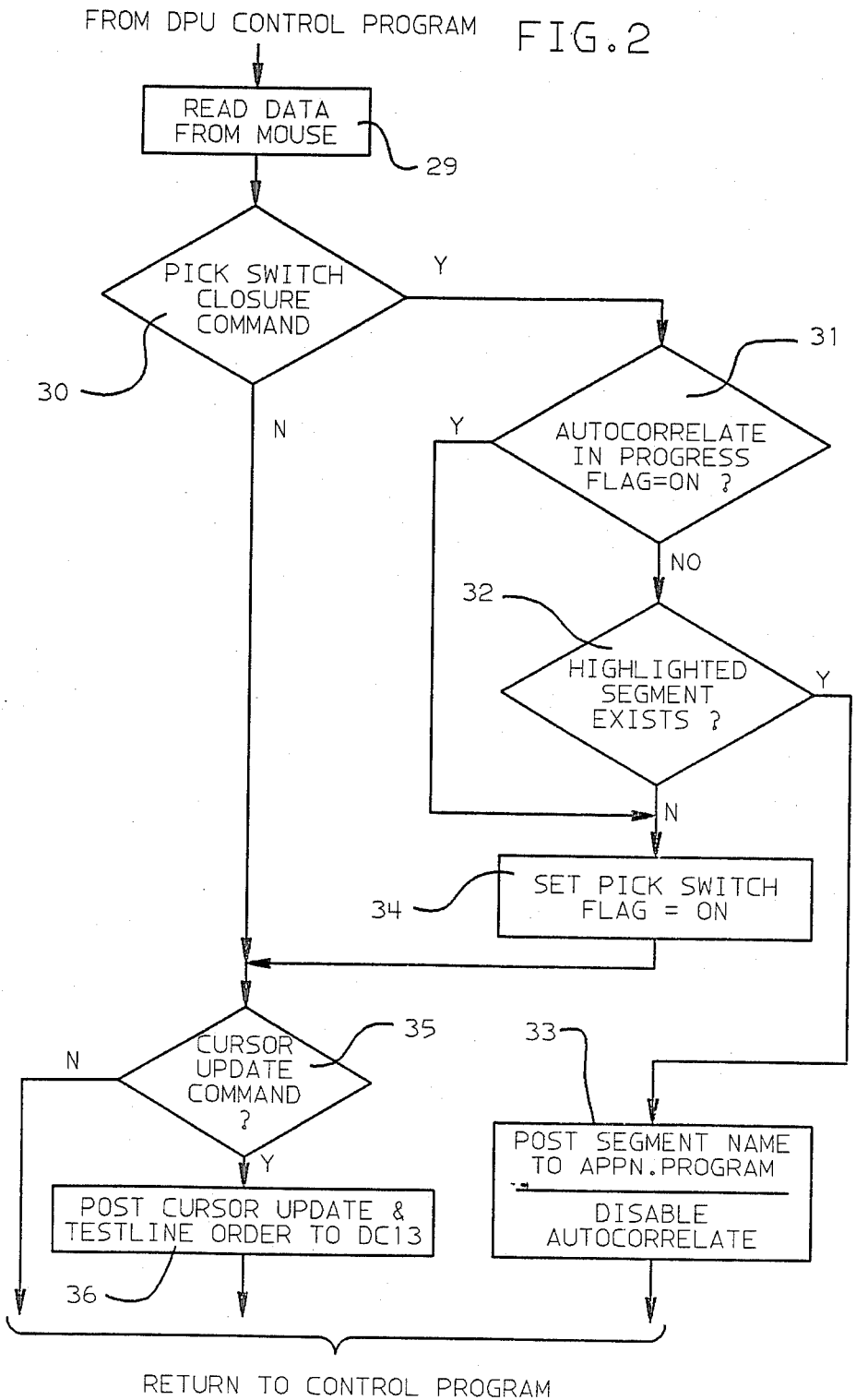

Referring now to FIG. 2, the cursor update phase is triggered by a control program in the DPU 10 at the frame refresh rate, and uses the following flags which are located in the memory 11:

AUTO-CORRELATE IN-PROGRESS FLAG: This flag is ON when the DC 13 is currently performing a correlate operation.

PICK SWITCH FLAG: This flag is ON when the pick switch on the mouse is depressed.

First, the data from the mouse 12 is read (step 29) and examined (step 30) to determine whether it contains a pick switch closure command. If there is, the AUTO-CORRELATE IN-PROGRESS FLAG is inspected, step 31, and if it is OFF (no correlate currently in progress) a determination is made as to whether a highlighted segment currently exists, step 32. If it does the name of the segment is posted to the application program as a user-selected segment and the auto-correlate mechanism is disabled, step 33. On the other hand, if the AUTO-CORRELATE IN-PROGRESS FLAG is ON at step 31 or no highlighted segment exists at step 32, the PICK SWITCH FLAG is set ON at step 34.

If no pick switch closure command is detected at step 30, or after the PICK SWITCH FLAG has been set ON at step 34, the data read at step 21 is examined for containing a cursor update command (step 35) which indicates that the cursor position has changed since the last sample point. If there is no cursor position update command no further action is taken in this phase, but if the cursor position has changed the new cursor position is posted together with a TESTLINE order to the DC 13, step 36.

The TESTLINE function is performed by the DC 13 and is shown in FIG. 5. In order to reduce redundant trigger point generation the TESTLINE order inhibits detection within an already used trap aperture, or 'blind spot'. This means that whenever successful detection of an "on" pel occurs the coordinates of the detected pel are noted by the DC 13 and stored for the use of future TESTLINE orders. The size of the blind spot is made equal to the correlate trap window aperture, and is centered on the coordinates of the detected pel. When a subsequent order is processed all coordinates falling within the blind spot are ignored and cannot cause auto-correlate triggers.

The TESTLINE order uses the following flags and registers which are located in the memories 14 and 15 as shown in FIG. 1:

START POINT REGISTER: This holds the coordinates $(X_o, Y_o)$ of the previous cursor position which constitutes the start point of the testline.

END POINT REGISTER: This holds the coordinates $(X,Y)$ of the current cursor position which constitutes the end point of the testline.

(P,Q) REGISTER: This holds the coordinates (p,q) of the frame buffer pel under examination at any given moment. The contents of this register change for each incremental step along the testline. The same register is used for normal line drawing.

DETECT (P,Q) FLAG: When this flag is ON it indicates that an "on" pel has been detected in the frame buffer. Associated with the flag are the coordinates (p,q) of the detected pel.

BLIND SPOT (P,Q) FLAG: When this flag is ON it indicates that a blind spot has been set around the coordinates of a pel detected to be "on". Associated with the flag are the coordinates (p,q) of the detected pel.

Referring now to FIG. 5, in step 40 the contents of the (P,Q) REGISTER are set to the start point $(X_o, Y_o)$ of the testline, and in step 41 the DETECT (P,Q)

FLAG is turned OFF if it is not already OFF. Next, step 42, the BLIND SPOT (P,Q) FLAG is examined for being ON by detection of a previous "on" pel. If the latter is ON, control is transferred to the right hand loop 43 to 45 of the flow diagram. This increments along the testline (step 45) using, for example, Bresenham's algorithm, and tests prior to each incremental move whether the current (p,q) is still in the blind spot (step 43) and whether the end point of the testline has been reached (step 44).

If the entire line lies within the blind spot the TESTLINE function exits via step 53 which sets the start point at (X,Y) in preparation for the next TESTLINE order. Otherwise, when (p,q) increments outside the blind spot, control is transferred to the left hand loop 46 to 48 of the flow diagram, as it is at the outset if the BLIND SPOT (P,Q) FLAG is found to be OFF at step 42.

This loop likewise increments along the testline, step 48, in this case testing at each stage whether the pel at (p,q) is "on" in the frame buffer (step 46) and whether the end point of the testline has been reached (step 47). If an "on" pel is detected, incrementing along the testline is halted and the DETECT (P,Q) FLAG is set ON (step 49). The BLIND SPOT (P,Q) FLAG is also set ON (step 50) at the new value of (p,q) just detected.

After setting the blind spot, the end point (current cursor position) is tested for being in the blind spot, step 51. If it is, the TESTLINE function exits via step 53, whereas if it is not the BLIND SPOT (P,Q) FLAG is reset OFF at step 52 prior to exit via step 53. Should no "on" pel be detected along the testline, incrementing around the loop 46 to 48 terminates when (p,q)=(X,Y) at step 47, the BLIND SPOT (P,Q) FLAG is reset OFF at step 52 and the TESTLINE function exits via step 53.

The second phase, FIGS. 3a and 3b, analyses the results from implementing the TESTLINE order, and triggers the auto-correlate process. In order to guard against overload of the correlate process only the most recent trigger point (detected "on" pel coordinates) will be processed. This means that at any one time there may be one trigger coordinate being processed and up to one other coordinate waiting to be processed. This procedure will assure that auto-correlate triggering can only occur for the most up-to-date trigger point. Out-of-date trigger points will be automatically discarded. Excessive trigger point generation will not therefore produce an overload or create delays on the correlate mechanism.

The second phase uses the following additional flag located in memory 11:

DELAYED (P,Q) TRIGGER FLAG: When this flag is ON it indicates that an "on" pel was detected while the AUTO-CORRELATE IN-PROGRESS FLAG is ON. Associated with the flag are the coordinates of the detected pel. When more than one "on" pel is detected while a prior triggered correlate is in progress, the coordinates of the most recently detected "on" pel override the coordinates of the previously detected pel. Referring to FIG. 3a, upon completion of the TESTLINE order, FIG. 5, the DPU 10 inspects the DETECT (P,Q) FLAG for being ON (step 60) and, if so, calls the TRIGGER (P,Q) subroutine (step 61).

The TRIGGER (P,Q) subroutine is shown in FIG. 3b. This subroutine first inspects the AUTO-CORRELATE IN-PROGRESS FLAG, step 62, and if it is OFF it orders the DC 13 to perform a correlate operation in respect of the coordinates (p,q) of the detected "on" pel, step 63, and sets the AUTO-CORRELATE IN-PROGRESS FLAG ON, step 64. The correlate operation is well known in the art and the details of this are not shown. However, if the AUTO-CORRELATE IN-PROGRESS FLAG is ON at step 62, indicating that a correlate operation is currently being performed by the DC 13, the DELAYED (P,Q) TRIGGER FLAG is set ON, step 65, thereby quening the coordinates of the detected "on" pel for later processing.

Subsequently, step 66 (FIG. 3a), the BLIND SPOT (P,Q) FLAG is tested for being ON, and if it not the TRIGGER (P,Q) subroutine is once again called, step 67. In this latter case, however, the TRIGGER (P,Q) subroutine uses the coordinates (X,Y) of the end point of the testline rather than the coordinates (p,q) of the detected "on" pel, if any.

If no "on" pel was detected in the testline, i.e. the DETECT (P,Q) FLAG is OFF at step 60, the TRIGGER (P,Q) subroutine at step 61 is bypassed, and the subroutine at step 67 is again bypassed if the BLIND SPOT (P,Q) FLAG is found to be ON at step 66. The correlate post-processing and highlighting/dehighlighting phase is shown in FIG. 4. A successful correlate (i.e. one that caused a segment 'hit') results in that segment being highlighted, while an unsuccessful correlate results in any highlighted segment being de-highlighted.

Referring to FIG. 4, after a correlate operation (step 63, FIG. 3b) the DPU 10 first determines whether the correlate operation has been successful, i.e. whether a segment has been identified by the DC 13 (step 70). If so, it then determines whether a highlighted segment already exists, step 71. If a highlighted segment does exist the DPU 13 determines whether this is the same segment as that identified by the DC 13, step 72. If it is the correct segment, then the PICK SWITCH FLAG is examined for being ON, step 75; otherwise the old segment is de-highlighted (step 73) and the new one highlighted (step 74).

If the PICK SWITCH FLAG is ON at step 75, the segment name is placed in the shared RAM 14 for posting to the application program in the host as a user-selected name, and the auto-correlate mode is disabled, step 76. If the PICK SWITCH FLAG is OFF at step 75, the DELAYED (P,Q) TRIGGER FLAG is examined for being ON (step 77), and if it is the stored coordinate (p,q) is passed to the DC 13 to perform a further correlate operation, and the DELAYED (P,Q) TRIGGER FLAG is reset OFF, step 79. Otherwise, if there is no stored trigger point waiting to be processed (DELAYED (P,Q) TRIGGER FLAG is OFF in step 77), the AUTO-CORRELATE IN-PROGRESS FLAG is reset OFF, step 78. If step 70 did not indicate a successful correlate, step 80 determines whether a highlighted segment exists and, if so, step 81 de-highlights it before passing on to step 77.

In FIG. 6, the crosses C1 to C5 represent successive cursor positions on the CRT screen, the arrows T1 to T4 represent the direction of motion of the cursor and also the testlines joining the successive cursor positions, the lines L1 to L4 represent parts of different graphic line segments in the frame buffer 17, the points P1 to P4 represent trigger points at each of which a correlate operation may be triggered, and the squares B1 to B3 represent the blind spots surrounding the trigger points which resulted in a successful correlate.

P1 is a trigger point generated where the testline T1 meets segment L1. No further trigger point is generated at the cursor position C2 since the latter lies inside the blind spot B1. P2 is a trigger point generated where the testline T2 meets segment L2, but no further trigger point is generated by line segment L3 since testline examination halts after the first segment encountered. P3 is a trigger point generated at the end point of testline T2 (cursor position C3) because it lies outside the blind spot B2 associated with P2. P4 is a trigger point generated where the testline T3 meets the segment L4, but no further trigger point is generated at the cursor position C4 as the latter lies inside the blind spot B3. Finally, no trigger point is generated along testline T4 as it lies entirely within the blind spot B3.

P1 will cause a correlate operation to occur, and if this is not completed by the time P4 occurs then the intervening trigger points P2 and P3 will be discarded. Thus line L1 will be temporarily highlighted and when the correlate process associated with P4 is complete line L1 will be dehighlighted and line L4 highlighted.

I claim:

1. In an interactive graphics display system in which pels in a frame buffer are mapped to the display screen of a raster display device, a method of automatically highlighting and de-highlighting graphic segments as a cursor is moved from an initial position to successive positions across the display screen said method comprising sampling a locator device at an initial and successive points in time to generate a screen cursor at corresponding positions on the screen raster, examining pels in the frame buffer along a line which extends from the pel corresponding to a previous cursor position in the succession of positions to the pel corresponding to the current cursor position to determine whether a pel is "on" along the line, such pel examination occurring at least when the current cursor position is greater than a certain distance from a previously detected "on" pel, automatically performing a correlate operation in respect of a newly detected "on" pel (if any) to identify the said graphic segment associated with that pel in said buffer and highlighting said segment, the correlate operation being performed when a prior correlate operation is not already in progress, and highlighting the newly correlated said segment, any highlighted segment being de-highlighted prior to highlighting a different segment.

2. A method according to claim 1, wherein when one or more "on" pels are detected while a prior correlate operation is in progress, the coordinates of the "on" pel detected most recently before the completion of the prior correlate operation are stored and a further correlate operation is automatically performed with respect to the pel identified by the stored coordinates immediately upon completion of the prior correlate operation.

3. A method according to claim 2, wherein when an "on" pel is detected, a display region is set centered on the detected pel which inhibits further pel examination until the cursor position moves out of said region.

4. A method according to claim 3, wherein pel examination along the said line occurs in the direction from the previous to the current cursor position, starting either at the previous cursor position or at the first pel outside of said region if one is set, and halts when the first "on" pel (if any) is encountered.

5. A method according to claim 4, wherein a further automatic correlate operation is performed at the current cursor position, unless that position lies within a said region, and any highlighted raster segment is de-highlighted in the event that the correlate operation does not identify a graphic segment.

6. A method according to claim 1, wherein when an "on" pel is detected, a display region is set centered on the detected pel which inhibits further pel examination until the cursor position moves out of said region.

7. A method according to claim 6, wherein pel examination along the said line occurs in the direction from the previous to the current cursor position, starting either at the previous cursor position or at the first pel outside of said region if one is set, and halts when the first "on" pel (if any) is encountered.

8. A method according to claim 7, wherein a further automatic correlate operation is performed at the current cursor position, unless that position lies within said region, and any highlighted line segment is de-highlighted in the event that the correlate operation does not identify a graphic segment.

* * * * *